US008245614B2

(12) United States Patent
Weston et al.

(10) Patent No.: US 8,245,614 B2

(45) Date of Patent: Aug. 21, 2012

(54) GUARD ASSEMBLY FOR TABLE SAW

(75) Inventors: Jeffrey D. Weston, Jackson, TN (US); Craig Carroll, Milan, TN (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 13/042,718

(22) Filed: Mar. 8, 2011

(65) Prior Publication Data

US 2011/0154968 A1 Jun. 30, 2011

Related U.S. Application Data

(63) Continuation of application No. 12/169,146, filed on Jul. 8, 2008, now Pat. No. 7,921,755.

(60) Provisional application No. 60/949,922, filed on Jul. 16, 2007.

(51) Int. Cl.
*B23D 45/06* (2006.01)
*B27G 19/08* (2006.01)

(52) U.S. Cl. ...... 83/102.1; 83/477.2; 83/478; 83/DIG. 1

(58) Field of Classification Search ................. 83/102.1, 83/478, 477.2, DIG. 1
See application file for complete search history.

(56) References Cited

U.S. PATENT DOCUMENTS

| | | | | |
|---|---|---|---|---|
| 713,196 | A * | 11/1902 | Bennett | 83/102.1 |
| 2,247,314 | A * | 6/1941 | Sellmeyer | 83/471.2 |
| 6,170,370 | B1 * | 1/2001 | Sommerville | 83/102.1 |
| 7,210,386 | B1 * | 5/2007 | Chang | 83/477.2 |
| 2004/0011177 | A1 * | 1/2004 | Huang | 83/478 |
| 2004/0118261 | A1 * | 6/2004 | Garcia et al. | 83/471.3 |
| 2005/0188806 | A1 * | 9/2005 | Garcia et al. | 83/471.3 |
| 2007/0113714 | A1 * | 5/2007 | Burke et al. | 83/102.1 |
| 2009/0241746 | A1 * | 10/2009 | Keller et al. | 83/102.1 |

* cited by examiner

*Primary Examiner* — Stephen Choi

(74) *Attorney, Agent, or Firm* — Adan Ayala

(57) ABSTRACT

A table saw includes a base assembly, a table assembly supported by the base assembly, a saw assembly having a blade extending through the table assembly, and a riving knife assembly connected to the saw assembly. The riving knife assembly has a removable riving knife, and a riving knife locking mechanism for locking the riving knife in the riving knife assembly. A handle is mounted to the base assembly or the table assembly, and is connected to the riving knife locking mechanism for releasing the riving knife without using additional tools.

17 Claims, 5 Drawing Sheets

GUARD ASSEMBLY FOR TABLE SAW

This application is a continuation of U.S. application Ser. No. 12/169,146, filed on Jul. 8, 2008 now U.S. Pat. No. 7,921,755, and which is wholly incorporated herein by reference, which in turn derives priority from U.S. Application No. 60/949,922, filed Jul. 16, 2007.

FIELD

This specification relates to table saws and more specifically to riving knife and/or guard assemblies for table saws.

SUMMARY

A table saw including a base assembly, a table assembly supported by the base assembly, a saw assembly connected to at least one of the base assembly and the table assembly, the saw assembly having a blade extending through the table assembly, a riving knife assembly connected to the saw assembly, the riving knife assembly having a removable riving knife, and a riving knife locking mechanism for locking the riving knife in the riving knife assembly. The riving knife locking mechanism includes a handle mounted to the base and/or table assembly, and connected to the riving knife locking mechanism for releasing the riving knife without using additional tools.

Additional features and benefits of the present invention are described, and will be apparent from, the accompanying drawings and the detailed description below.

BRIEF DESCRIPTION OF THE FIGURES

The accompanying drawings illustrate preferred embodiments according to the practical application of the principles thereof, and in which.

DETAILED DESCRIPTION

The present invention will now be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
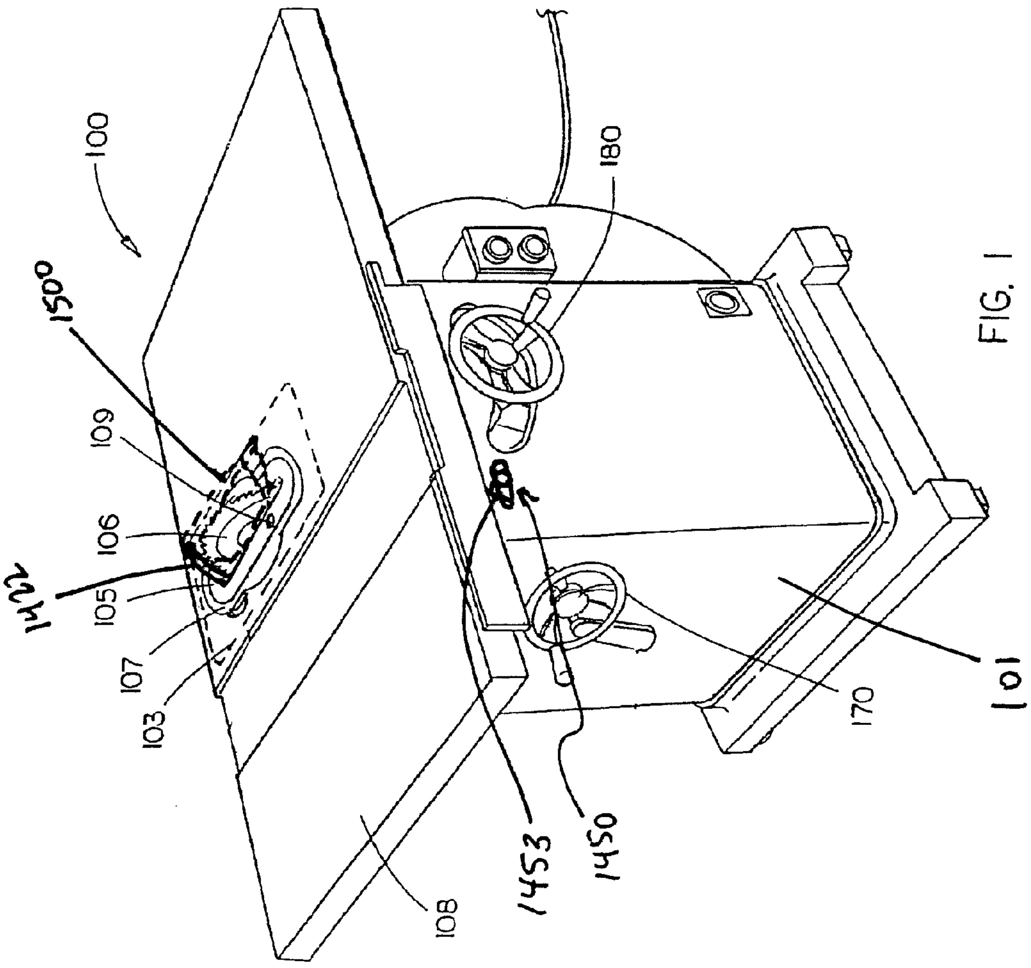
FIG. 1 is an exemplary table saw incorporating the invention.
Figure 2:
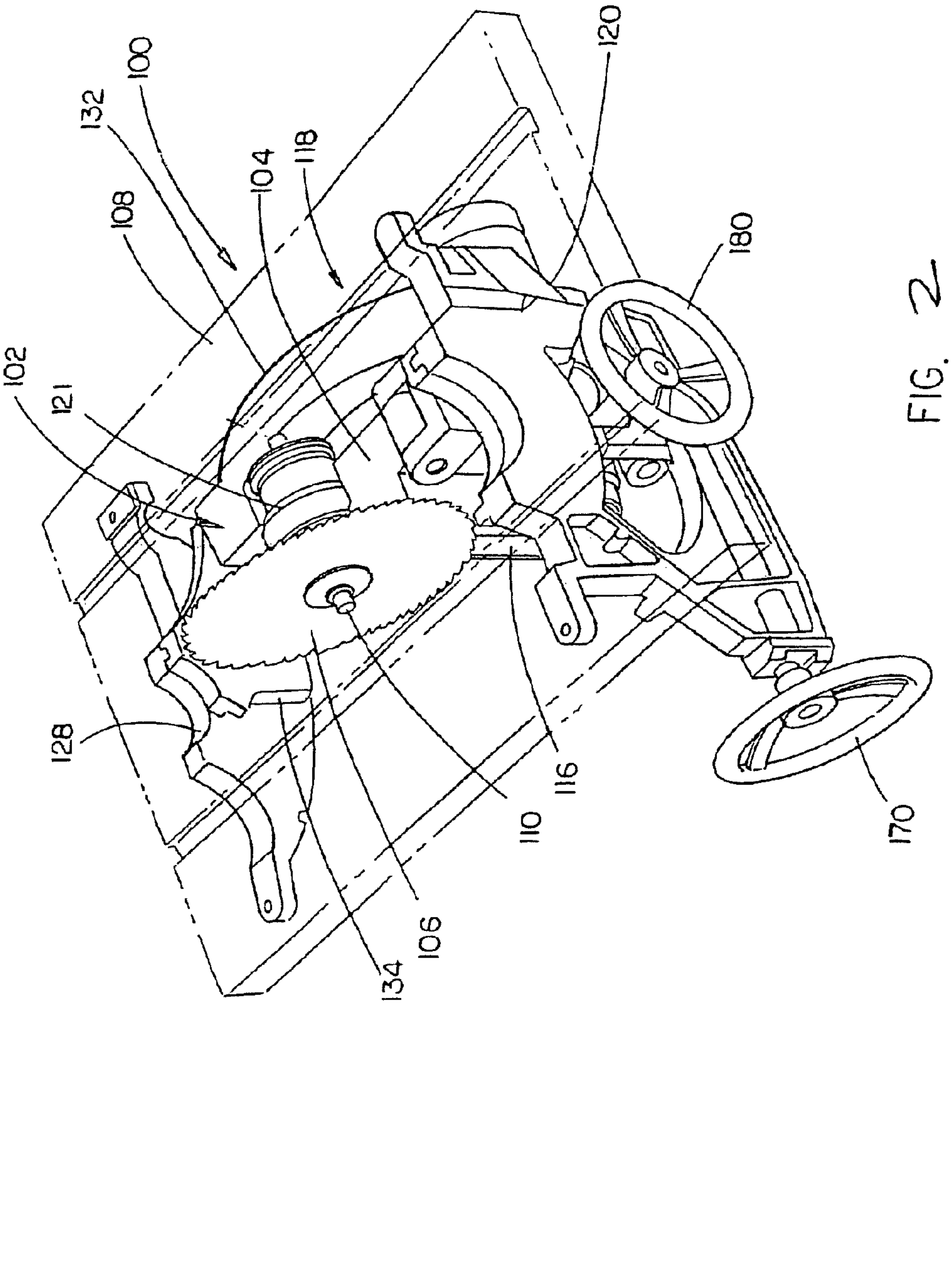
FIG. 2 is an expanded perspective view of a saw assembly of the table saw.
Figure 3:
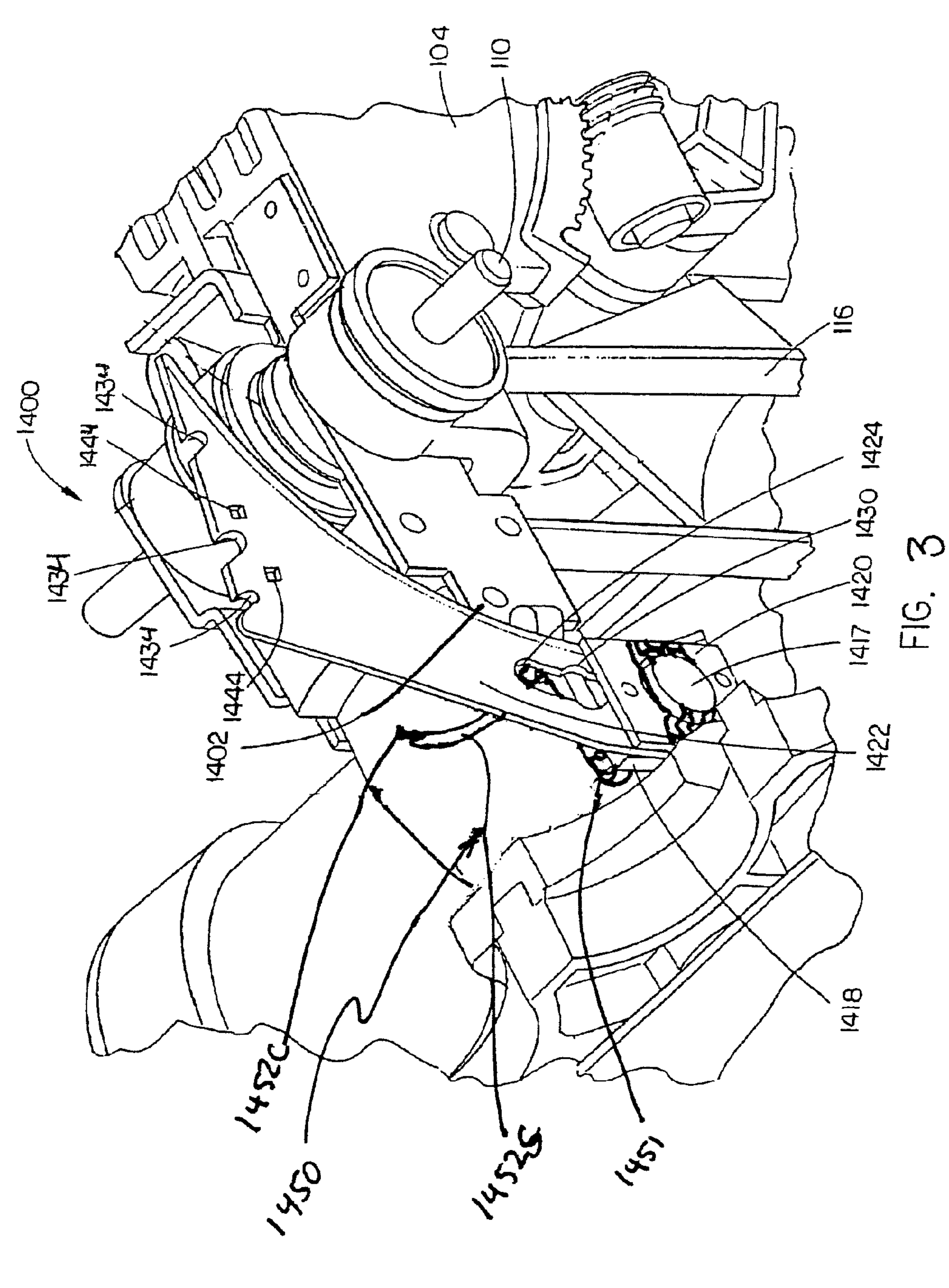
FIG. 3 is an isometric illustration of an exemplary riving knife assembly.
Figure 4:
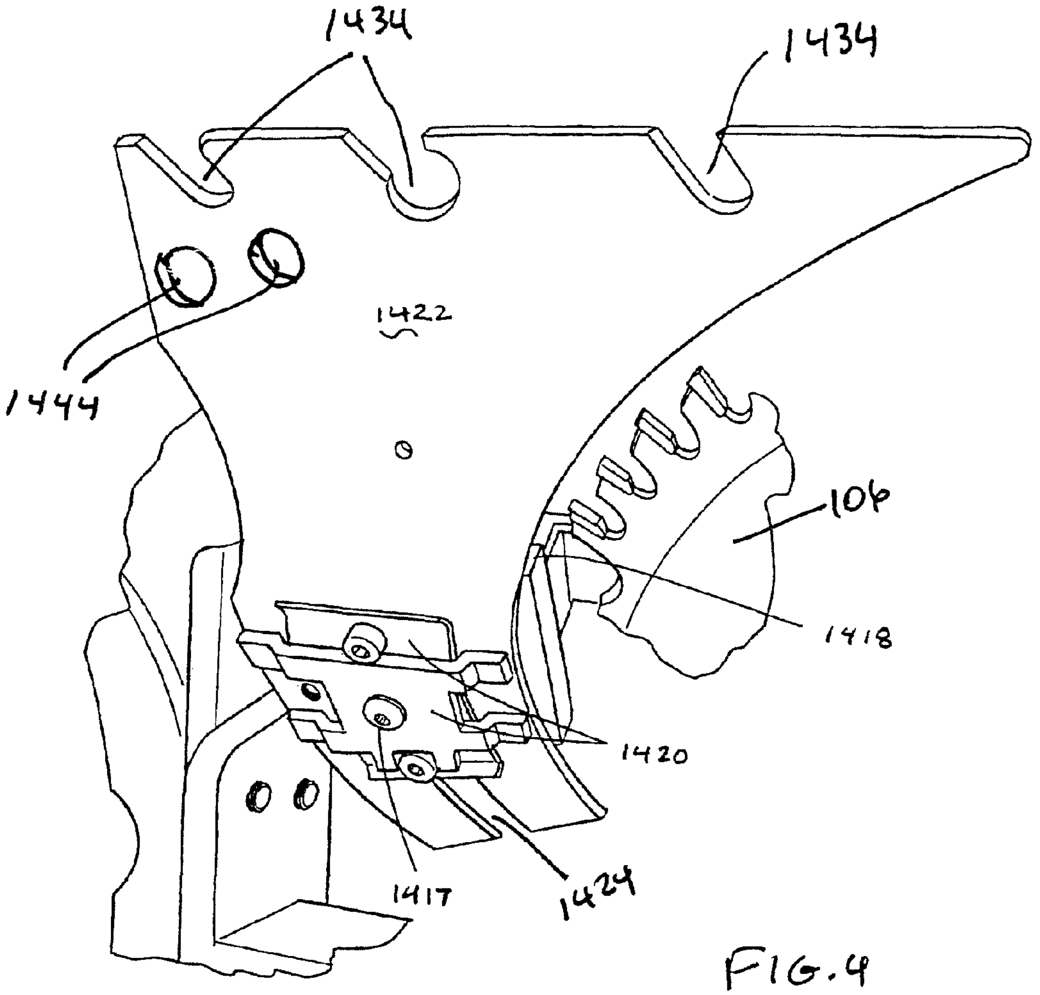
FIG. 4 is an alternate isometric left-side illustration of the riving knife assembly.
Figure 5:
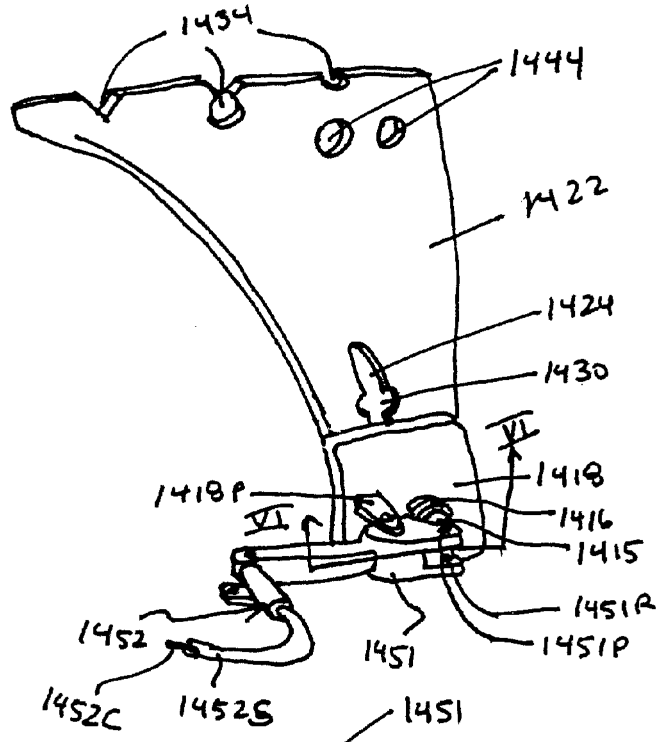
FIG. 5 is an isometric right-side illustration of the riving knife assembly.
Figure 6:
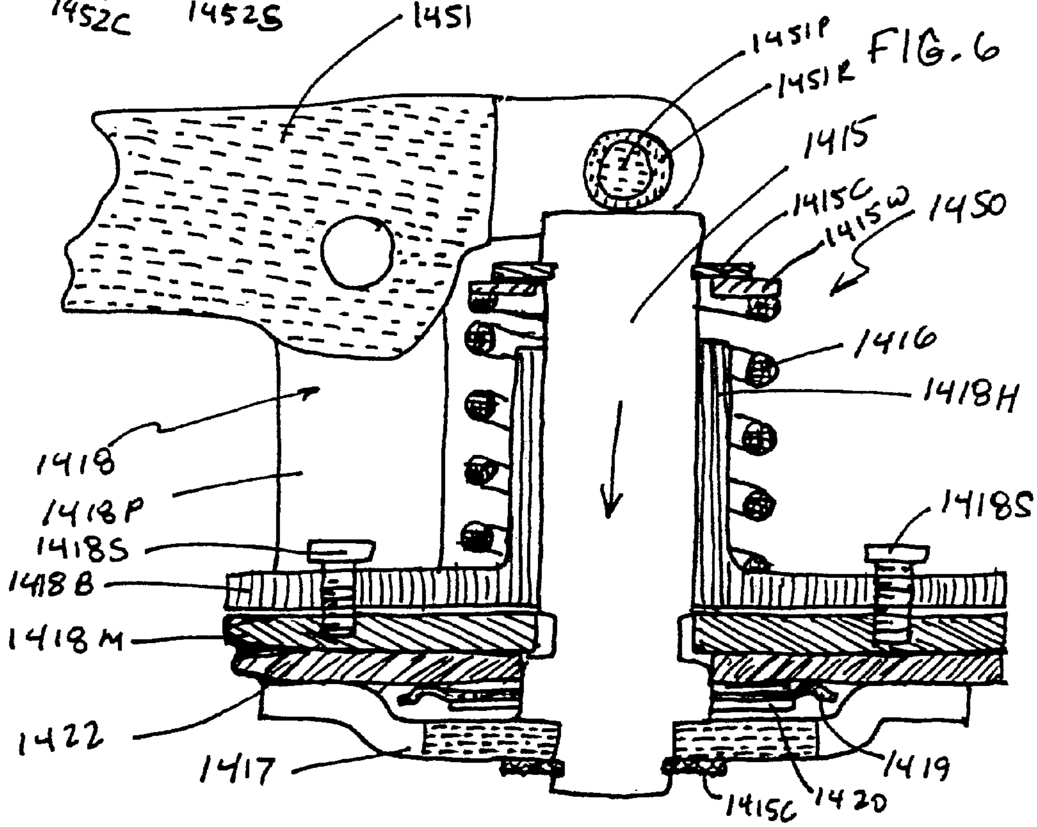
FIG. 6 is a cross-sectional view of the riving knife assembly along line VI-VI of FIG. 5.

Referring to FIGS. 1-3, a bevel table saw 100 in accordance with exemplary embodiments of the present invention are described. Persons skilled in the art are referred to U.S. Pat. No. 7,137,327, which is wholly incorporated by reference.

The table saw 100 preferably includes a base 101, a table 108 supported by the base 101, and a circular saw blade 106 operationally coupled with a motor (not shown), via an arbor assembly 102. The arbor assembly 102 includes an arbor bracket 104 for supporting blade 106 which may be extended through table 108. Arbor assembly 102 is preferably coupled to the motor via a belt drive 116, which operationally engages around an arbor pulley 121 which is operationally connected to an arbor shaft 110.

The table saw 100 may also include a bevel assembly 118 for adjustably beveling the arbor assembly 102 to establish a plurality of angular settings of the saw blade 106. The bevel assembly 118 may include a first or front mounting bracket 120 mounted to the base 101 and/or table 108, a first or front trunnion (not shown) pivotally mounted to front mounting bracket 120, a second or back mounting bracket 128 mounted to the base 101 and/or table 108, a second or back trunnion 134 pivotally mounted to back mounting bracket 128. A brace member 132 may extend between the front and the rear trunnions 134 for maintaining alignment. Arbor bracket 102 is preferably connected to the front and rear trunnions 134 to allow beveling or tilting of the saw blade 106.

The beveling of the saw blade 102 is further enabled by a bevel adjustment assembly, which preferably includes crank 170, as is well known in the art. Persons skilled in the art are referred to U.S. Pat. No. 7,137,327 for an exemplary mechanism.

Furthermore, the height of saw blade 102 may be adjusted by a height adjustment assembly, which preferably includes crank 180, as is well known in the art. Persons skilled in the art are referred to U.S. Pat. No. 7,137,327 for an exemplary mechanism. Other height adjustment mechanisms are described in U.S. Pat. Nos. 5,875,668 and 6,009,782, which are wholly incorporated by reference.

The circular saw blade 106 may extend through a throat plate assembly 103 which, in the preferred embodiment, comprises an inner throat plate 105 and an outer throat plate 107. The inner throat plate 105 may include an aperture or recess 109 to allow a user to remove the inner throat plate 105 to adjust the saw configuration. The outer throat plate 107 may include an aperture or recess for the removal of the outer throat plate 107 as well. As will be described infra, the ability to remove and replace the inner and outer throat plate 105 and 107 further allows convenient access to the arbor assembly 102 such as when changing blades or the like. Alternatively, the throat plate assembly 103 may comprise a single throat plate. It is further contemplated that the throat plate assembly 103 may be composed of various materials, such as metal, plastic, wood, composite, and the like.

In a further aspect of the invention, a riving knife assembly 1400 is shown in FIGS. 1 and 3-6. The riving knife assembly 1400 may include a first mounting member 1402 coupled with arbor bracket 104. Preferably, the riving knife assembly 1400 can adjust its vertical position in relationship with any height adjustment made to the saw blade 106, as is well known in the art.

Riving knife assembly 1400 also includes a riving knife 1422, which preferably includes an engagement assembly 1424 extending at least partially along the length of the riving knife 1422. The engagement assembly 1424 may be a slot defining a recess within the riving knife 1422, as is well known in the art. The slot of the engagement assembly 1424 further defines at least one (and preferably two) locking assembly 1430. The locking assemblies 1430 may be circular apertures which allow a locking pin 1415 to engage in preset locations and securely establish the position of the riving knife 1422.

The first mounting member 1402 is further disposed with a quick release assembly 1450. The quick release assembly 1450 preferably includes a knife mounting member 1418 connected to first mounting member 1402. Knife mounting member 1418 may have a body 1418B and a hollow projection 1418H. Knife mounting member 1418 may also have a movable plate 1418M attached to body 1418B. The position of movable plate 1418M relative to body 1418B may be adjusted via screw(s) 1418S.

Quick release assembly 1450 may also include a clamp plate 1417. Riving knife 1422 is preferably disposed between clamp plate 1417 and movable plate 1418M and/or body 1418B.

Preferably, a spring plate 1419 is disposed between clamp plate 1417 and riving knife 1422 for biasing riving knife 1422 against movable plate 1418M and/or body 1418B. A sheathing member 1420 may be disposed between clamp plate 1417, spring plate 1419 and/or riving knife 1422.

A locking pin 1415 preferably extends through projection 1418H, through body 1418B, movable plate 1418M, riving knife 1422, spring plate 1419, sheathing member 1420 and/or clamp plate 1417. Clips 1415C may be disposed at the ends of pin 1415 to capture pin 1415.

A spring 1416 may be disposed body 1418B and the clip 1415C farthest away from clamp plate 1417 to bias pin 1415 (and thus clamp plate 1417). A washer 1415W may be disposed between such clip 1415C and spring 1416.

Preferably spring 1416 will provide enough force to retain riving knife 1422 between clamp plate 1417 and body 1418B and/or movable plate 1418M. Pin 1415 may also engage a locking assembly 1430 of riving knife 1422 at a preset location and thus securely establish the position of the riving knife 1422.

To unlock the riving knife 1422 for removal, pin 1415 would have to be moved towards clamp plate 1417. This can be accomplished by providing a lever 1451 pivotally attached to a post 1418P connected to body 1418B. Lever 1451 may have a pin 1451P and/or a roller 1451R for contacting pin 1415.

Lever 1415 may be connected to a cable assembly 1452, which is preferably attached to first mounting member 1402. Cable assembly 1452 preferably includes a cable 1452C connected to lever 1415. Preferably cable 1452C is covered by a sheath 1452S. Cable 1452C is connected to a handle 1453, preferably mounted on body assembly 101 and/or table 108.

With such arrangement, the user can pull handle 1453, pulling cable 1452C and pushing pin 1451P and/or roller 1451R into pin 1415. Persons skilled in the art will recognize that such arrangement permits the release of riving knife 1422 without using additional tools.

The riving knife assembly 1400 may further include a guard assembly 1500 which may be removably coupled with the riving knife 1422 via at least one slot 1434, as is well known in the art.

The riving knife assembly 1400 may also support anti-kickback pawls (not shown). These pawls may be fixedly or removably attached to the riving knife 1422, preferably through at least one slot or hole 1444.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A table saw comprising:

a base assembly having a front panel;

a table assembly supported by the base assembly;

a saw assembly having a blade extending through the table assembly and a height adjustment crank disposed forwardly of the front panel along a predetermined direction, the predetermined direction being opposite to a direction in which a workpiece is moved into the blade for cutting, the blade being disposed rearwardly of the front panel along the predetermined direction;

a riving knife assembly connected to the saw assembly, the riving knife assembly having a removable riving knife disposed rearwardly of the blade along the predetermined direction, and a riving knife locking mechanism for locking the riving knife in the riving knife assembly; and a handle mounted to one of the base assembly and the table assembly, the handle being disposed forwardly of the blade along the predetermined direction and connected to the riving knife locking mechanism for releasing the riving knife without using additional tools.

2. The table saw of claim 1, wherein a cable connects the handle to the riving knife locking mechanism.

3. The table saw of claim 1, wherein the riving knife comprises an engagement assembly extending at least partially along the length of the riving knife.

4. The table saw of claim 3, wherein the engagement assembly is a slot.

5. The table saw of claim 3, wherein the riving knife assembly further comprises a mounting member for connecting the riving knife assembly to the saw assembly.

6. The table saw of claim 5, wherein the riving knife locking mechanism is disposed on the mounting member.

7. The table saw of claim 6, wherein the riving knife locking mechanism comprises a knife mounting member connected to the mounting member disposed on a first side of the riving knife, a clamp plate disposed on a second side of the riving knife, and a locking pin attached to the clamp plate and extending through the riving knife.

8. The table saw of claim 7, wherein the riving knife locking mechanism further comprises a spring disposed between the locking pin and the knife mounting member for biasing the clamp plate towards the riving knife.

9. The table saw of claim 7, wherein the riving knife locking mechanism further comprises a lever for moving the locking pin between a first position where the clamp plate contacts the riving knife and a second position where the clamp plate does not contact the riving knife.

10. The table saw of claim 9, wherein the lever is connected to a cable.

11. The table saw of claim 10, wherein the cable is connected to the handle.

12. The table saw of claim 1, wherein a guard assembly is connected to the riving knife.

13. A table saw comprising:

a base assembly having a front panel;

a table assembly supported by the base assembly;

a saw assembly having a blade extending through the table assembly, the saw assembly being disposed rearwardly of the front panel along a predetermined direction, the predetermined direction being opposite to a direction in which a workpiece is moved into the blade for cutting;

a riving knife assembly connected to the saw assembly, the riving knife assembly being disposed rearwardly of the front panel alone the predetermined direction, the riving knife assembly having a removable riving knife, a mounting member for connecting the riving knife assembly to the saw assembly, and a riving knife locking mechanism for locking the riving knife in the riving knife assembly, the riving knife locking mechanism being disposed on the mounting member, wherein the riving knife locking mechanism comprises a knife mounting member connected to the mounting member disposed on a first side of the riving knife, a clamp plate disposed on a second side of a locking pin attached to the clamp plate and extending through the riving knife, and a lever for moving the locking pin between a first position where the clamp plate contacts the riving knife and a second position where the clamp plate does not contact the riving knife; and a handle mounted to one of the base assembly and the table assembly, the handle being disposed forwardly of the riving knife assembly in the predetermined direction and connected to the riving knife locking mechanism for releasing the riving knife without using additional tools.

14. The table saw of claim 13, wherein the lever is connected to a cable.

15. The table saw of claim 14, wherein the cable is connected to the handle.

16. The table saw of claim 13, wherein the riving knife comprises an engagement assembly extending at least partially along the length of the riving knife.

17. The table saw of claim 13, wherein a guard assembly is connected to the riving knife.

* * * * *